Jan. 26, 1965    R. H. SAVAGE    3,167,143
ANALYTICAL BALANCE
Filed Aug. 22, 1963
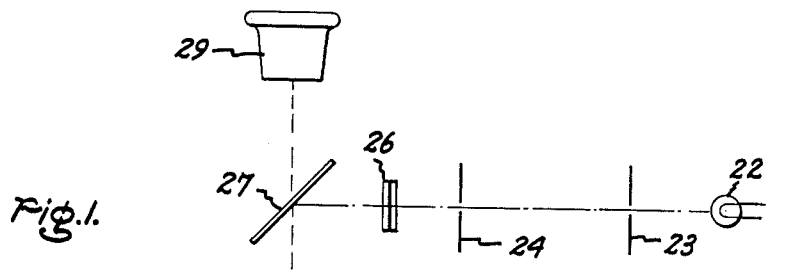
Fig. 1.
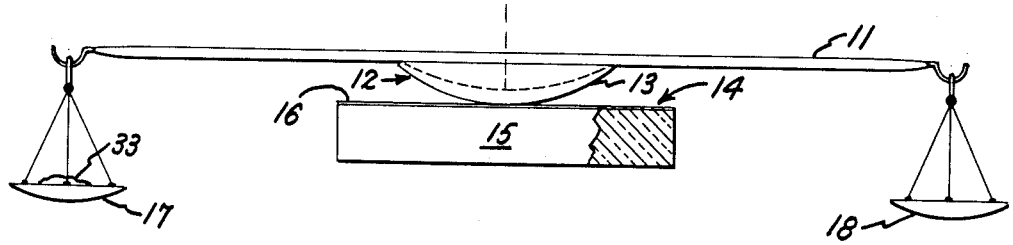
Fig. 2.    Fig. 1a.
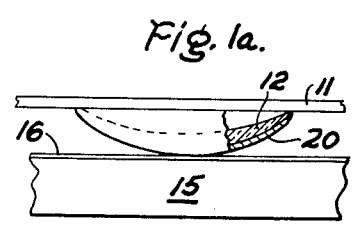
Fig. 3.
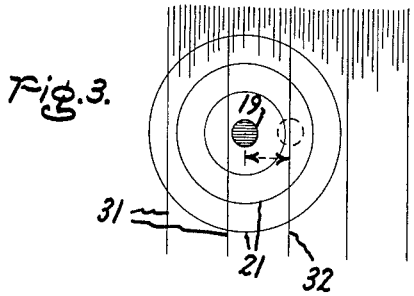
Inventor:
Robert H. Savage,
by Leo J. MeLossi
His Attorney.

United States Patent Office 3,167,143
Patented Jan. 26, 1965

3,167,143
ANALYTICAL BALANCE
Robert H. Savage, Scotia, N.Y., assignor to General
Electric Company, a corporation of New York
Filed Aug. 22, 1963, Ser. No. 303,908
13 Claims. (Cl. 177—190)

This invention relates to a device for accurately weighing small quantities of material, and more particularly is concerned with analytical balances.

In the type of analytical balance commonly employed in the art a weighing beam is supported on a knife-edge and weighing pans are suspended from each end of the weighing beam. A sample of material to be weighed is placed in one pan and known increments of weight are placed in the other pan. When an indicating pointer is made to coincide with the zero position on the scale of the weighing device, it is known that the weight of the sample of material is equal to the sum of the individual increments of known weights deposited in the opposite pan.

It is well known that the limit of accuracy of the conventional analytical balance depends strongly on the extent of wear to which the balancing knife-edge has been subjected as well as upon the initial geometry. As the knife-edge becomes slightly rounded an increasing amount of friction is imposed upon the system and the sensitivity of the device diminishes markedly. Regardless of the type of material or the design employed in the construction of the knife-edge, wear inevitably occurs and prevents the system from being critically elastic.

It is, therefore, an object of the present invention to provide a weighing instrument wherein the degree of unbalance is indicated optically with a system of extreme sensitivity and of substantially improved elasticity.

A further object of the present invention is the provision of a weighing device substantially free from error and maintenance due to the wearing of the beam support.

The above objects are secured with the device of this invention comprising essentially the combination of a base with a flat level surface formed thereon; a reflecting film on the flat surface; a transparent convex optical element, such as a lens or cylindrical body, resting on the reflecting film with the convex surface thereof in elastic contact therewith; a longitudinally extending weighing beam or bar mounted on the upper side of the element; means attached to at least one end of the bar for receiving material to be weighed; means mounted over and in alignment with the element and surface for viewing a magnified field in focus perpendicularly downward through the optical element, the view of this magnified field including the contact area between the underside of the element and the reflecting film, which contact area is centrally located and appears as a dark circular spot in the case of a lens and a dark bar in the case of a cylindrical body, and also including the image of a fringe system about the dark center; a light source for directing light to the magnified field for illumination thereof, and datum means superimposed on the magnified field against which to observe and refer the extent of displacement of the contact area by tilting of the element upon depositing on the receiving means material to be weighed.

Although they are not included in this description of the invention it is to be understood that the means commonly employed in conventional analytical balances for levelling the balance and protecting the device from drafts are to be used as well in connection with more refined versions of this invention.

The exact nature of this invention as well as other objects and advantages thereof will be readily apparent from consideration of the following specification relating to the annexed drawing in which:

FIG. 1 is an elevational view partially in section diagrammatically illustrating the basic components comprising this invention in a preferred relationship;

FIG. 1a is a detail showing an alternate construction for lens 12;

FIG. 2 is a schematic plan view of the magnified field as seen through the optical viewing instrument with the scale within the eyepiece arranged in focus and superimposed on the magnified field, the device being in the unloaded or "zero" position, and FIG. 3 is a schematic plan view of the magnified field similar to that in FIG. 2 but displaying the dark spot of the contact area and the surrounding images of the interference fringes laterally offset from the zero position due to minute tilting of the lens resulting from the placement of material in one weighing pan.

Referring now to the drawing wherein like reference characters designate like or corresponding parts throughout the several views, there is shown in FIG. 1 a small-scale balance constructed by mounting the weighing beam 11 across the upper side of the transparent convexoconcave lens 12, lens 12 being mounted with its convex surface 13 resting upon the flat level solid surface 14 of supporting body 15, which has thereover an opaque reflecting film 16 of gold or other hard opaque reflecting material, such as platinum, iridium or crystalline graphite. Depending from opposite ends of weighing beam 11 are the weighing pans 17, 18, the former for receiving material to be weighed and the latter for receiving the known incremental weights.

Depending on the material used, the thickness of the reflecting film 16 may vary so long as it is thick enough to be opaque to the degree of 50% opacity or greater.

As shown in FIG. 2 a pattern of interference may be observed under magnification at the optical contact between convex lens 12 and the flat mirror surface of film 16. This interference pattern appears as a dark round spot 19 surrounded by a series of rings 21, known as Newton's rings, concentric therewith and each of which represents successive regions of optical interference located at calculable distances from each other. Dark circular area 19 results from elastic contact between lens 12 and film 16, the actual size of the contact area being much smaller than is shown under conditions of magnification in FIGS. 2 and 3.

In order to illuminate the general field about the area of contact between lens 12 and film 16, light is directed from light source 22 through apertured diaphragms 23, 24 and interference filter 26. Interference filter 26 serves to limit the passage of light therethrough to substantially monochromatic light having an average wave length ($\lambda$) equal to some known value, such as $\lambda = 546$ m$\mu$. The light that passes through both diaphragms 23 and 24 and filter 26 strikes the underside of the partially silvered reflector 27 and is directed thereby vertically downward through the objective lens 28. This lens 28 is employed to bring the interference pattern referred hereinabove into focus. After passing through lens 28 the light rays continue downward through lens 12 and strike reflecting film 16.

Eyepiece 29 is mounted vertically above and in line with the reflector 27 and the viewing lens 28 and contains therein a reference scale comprising a series of parallel lines 31 which by appropriate movement of eyepiece 29 may be superimposed as an image in focus over the field and the interference pattern in the manner shown in FIG. 2. In practice, a reticle having a grouping of about fifty such equally spaced parallel lines has been employed as a scale within the eyepiece 29 of the optical system.

Only a few of lines 31 comprising the actual image of the scale have been shown in full length in order to more clearly display the interference pattern. The line designated by the numeral 32 represents the center of the scale and, in FIG. 2 line 32 is shown coincident with the center of spot 19, a circumstance which indicates that the weighing device is disposed in "zero" position.

Upon introducing material 33 to be weighed into weighing pan 17 that end of the weighing beam 11 was deflected downwardly causing lens 12 to tilt in proportion to the amount of load applied to the pan 17. As lens 12 is tilted, the image of the interference pattern comprising spot 19 and the surrounding rings 21 is laterally displaced in the direction of the depressed weighing pan 17. The degree of displacement of rings 21 in this manner is exactly proportional to the extent of displacement of pan 17 from the horizontal position shown in FIG. 1 and for this reason the ring displacement can be used as an accurate measure of the load, particularly since even a minute tilting of lens 12 is revealed by substantial lateral movement of spot 19 and rings 21 from centerline 32, the zero position.

By using the interference filter 26 to limit the illumination of the contact area to the application thereto of monochromatic light the sharpness of the image rings 21 is enhanced. This increase in sharpness of the ring image makes the extent of ring displacement more accurately determinable and has the effect of increasing the sensitivity of the device.

Still further increase in the sensitivity of the instrument may be achieved by the use of multiple beam interference in place of the two-beam method illustrated hereinabove. Thus, if instead of employing only the single reflecting film 16, dual critically reflecting surfaces 16 and 20 are employed as shown in FIG. 1a, each having a reflectivity in the order of 95 percent, a decided sharpening of the ring fringes 21 occurs. By this expedient the sensitivity of the device to determine changes in elevation of the weighted end of beam 11 under load is increased by factor of about 100. This multiple beam interference may be secured in the device illustrated in FIG. 1 simply by providing the convex surface 13 of lens 12 with a partially silvered surface 20 having the requisite degree of reflection.

It is well known that in this interference phenomenon the spacing between successive rings 21 is equal to $\lambda/2$ and, therefore, as long as the value of the wave length of the light employed is known, the relationship between beam deflection under the application of a load to be measured and the lateral displacement of the rings can be related to the load applied.

Thus, the weight of material placed in weighing pan 17 may be determined either by introducing known increments of weight into weighing pan 18 until the interference pattern is returned to its "zero" position or by measuring the extent of lateral displacement of the interference pattern relative to the scale image as a reference using a light source producing light of a known wave length.

In a given apparatus as described herein the interference filter 26 passed light having an average wave length of 546 m$\mu$. With an optical system having a magnifying power of 32x and an eyepiece reticle having 50 divisions across the field, the lines being equally spaced and calibrated with a stage micrometer at the particular field magnification, it was determined that the device had a sensitivity of 13 micrograms per scale division. It may, therefore, be seen that relatively great sensitivity to micromotion may be obtained even under low magnifying power. By increasing the magnification a proportional increase in the sensitivity is produced.

If more convenient, the light source and optical reflecting system (apertured diaphragms 23, 24, filter 26 and reflector 27) may be located below the solid supporting surface 14 directing the light upwards to illuminate the field. In such case the body 15 and the film 16 would be made of partially transparent material having a light transmission coefficient greater than about 50%.

Also, although one embodiment of this invention has been described employing a convex lens, a transparent cylindrical element having an arcuate surface portion in contact with the reflective film may be used. As indicated above such an element will cause the display of a centrally-located dark bar and to either side thereof are seen the interference pattern known as the Fizeau fringes. These fringes are straight or curved lines depending upon the particular curvature of the arcuate surface.

Although the transparent convex optical element may have other than a spherical or cylindrical convex curvature e.g., elliptical, convex curvatures relatable to a circular arc in the region of the rocking contact between the optical element and the base are preferable. With this type of convex curvature, a rocking contact curvature having a radius from about 2 mm to about 11 mm. is acceptable, while a radius from about 3 mm. to about 5 mm. is preferred. If the radius of curvature is too great, the fringe system is spread out too far and if the radius of curvature is too short, the weighting device is mechanically unstable.

Experiment has established the great capability of this device to consistently return to the same "zero" position when various weights are added to and then removed from one of the pans. The perfection of the geometry in a wholly elastic system has been achieved in this development in contrast to the inelastic and geometrically imperfect characteristics of knife-edge balance construction. In addition, the convex element-supporting surface combination is not subject to the high degree of wear to which the knife-edge support for the conventional analytical balance is consistently subjected.

Obviously many modifications and variations of the present invention are possible in the light of the above teachings. It is, therefore, to be understood that within the scope of the appended claims, the invention may be practiced otherwise then as specifically described.

What I claim as new and desire to secure by Letters Patent of the United States is:

1. An instrument for weighing comprising in combination:
    (a) a base having a flat surface formed thereon,
        (1) said surface having a high degree of reflectivity,
    (b) a transparent body with the outer surface thereof formed at least in part in a convexly curved arc,
        (1) said body resting with the curved portion thereof on said surface whereby said body may rocked relative to said surface,
    (c) a longitudinally extending member supported on and connected to said body,
        (1) said member extending at right angles to an axis about which said body may be rocked,
    (d) means attached to at least one end of said member for receiving material to be weighed,
    (e) means mounted over said body and said surface for viewing a magnified field from a direction perpendicular to said surface,
    (f) a light source,
    (g) means for directing light from said source to illuminate said field,
        (1) said illuminated field including the dark contact area between said curved portion of said body and said surface,
        (2) said contact area having regularly spaced therefrom the image lines of a fringe system,
        (3) said fringe lines being spaced a calculable distance apart, and
    (h) datum image means superimposed on said field against which to observe and refer the extent of displacement of said contact area and fringe system upon tilting of said body as the result of depositing material to be weighed on said receiving means.

2. An instrument for weighing comprising in combination:
   (a) a base having a flat level surface formed thereon,
   (b) a reflecting film on said flat surface,
   (c) a transparent body with the outer surface thereof formed at least in part in a convexly curved arc,
      (1) said body resting with the curved portion thereof on said reflecting film whereby said body may be rocked relative to said surface,
   (d) a longitudinally extending bar supported on and connected to said body,
      (1) said bar extending at right angles to an axis about which said body may be rocked,
   (e) means attached to at least one end of said bar for receiving material to be weighed,
   (f) means mounted over said body and said surface for viewing a magnified field from a direction perpendicular to said surface,
   (g) a light source,
   (h) means for directing light from said source to illuminate said field,
      (1) said illuminated field including the dark contact area between said curved portion of said body and said surface,
      (2) said contact area having regularly spaced therefrom the image lines of a fringe system,
      (3) said fringe lines being spaced a calculable distance apart, and
   (i) datum image means superimposed on said field against which to observe and refer the extent of displacement of said contact area and fringe system upon tilting of said body as the result of depositing material to be weighed on said receiving means.

3. An instrument for weighing comprising in combination:
   (a) a base with a flat level surface formed thereon,
   (b) a reflecting film on said flat surface,
   (c) a convex optical lens,
      (1) said lens resting with the convex surface thereof on said reflecting film in elastic contact therewith,
   (d) a longitudinally extending bar supported on and connected to the upper face of said lens,
   (e) means attached to at least one end of said bar for receiving material to be weighed,
   (f) means mounted over said lens and said surface for viewing a magnified field from a direction perpendicular to said surface,
   (g) a light source,
   (h) means for directing light from said source to illuminate said field,
      (1) said field including the contact area between said convex surface of said lens and said reflecting film,
      (2) said contact area appearing as a dark circular spot, and
      (3) said spot being surrounded by the image of a fringe system comprising a plurality of concentric rings each spaced from an adjacent ring by a calculable distance, and
   (i) datum image means superimposed on said field against which to observe and refer the extent of displacement of said contact area and fringe system upon tilting of said lens as the result of depositing material to be weighed on said receiving means.

4. The invention substantially as recited in claim 3 wherein the means for directing light directs only monochromatic light to illuminate the field.

5. The invention substantially as recited in claim 3 wherein the lens has a spherical convex surface having a radius of curvature from about 2 mm. to about 11 mm.

6. The invention substantially as recited in claim 3 wherein the reflecting film is of gold.

7. The invention substantially as recited in claim 3 wherein both the reflecting film and the convex surface of the lens have reflectivities in the order of 95% in order to provide multiple-beam interference.

8. An instrument for weighing comprising in combination:
   (a) a base with a flat level surface formed thereon,
   (b) an opaque reflecting film on said flat surface,
   (c) a convex optical lens,
      (1) said lens resting with the convex surface thereof on said reflecting film in elastic contact therewith,
   (d) a longitudinally extending bar mounted on and connected to the upper face of said lens,
   (e) means depending from one end of said bar for receiving material to be weighed,
   (f) means depending from the other end of said bar for supporting graduated incremental weights,
   (g) means mounted over said lens and said surface for viewing a magnified field in a direction perpendicular to said surface,
      (1) said magnified field including the contact area between said convex surface of said lens and said reflecting film,
      (2) said contact area appearing as a dark circular spot, and
      (3) said spot being surrounded by the image of an interference system of concentric rings, and
   (j) image datum means superimposed in focus on said field against which to observe and refer the extent of displacement of said contact area and interference system upon tilting of said lens from depositing material on said receiving means and weights on said supporting means.

9. The invention substantially as recited in claim 8 wherein the means for directing light passes only monochromatic light.

10. The invention substantially as recited in claim 8 wherein the lens has a spherical convex surface having a radius of curvature from about 2 mm. to about 11 mm.

11. The invention substantially as recited in claim 8 wherein the reflecting film is gold.

12. The invention as recited in claim 8 wherein both the reflecting film and the convex surface of the lens have reflectivities in the order of 95% in order to provide multiple-beam interference.

13. An instrument for weighing comprising in combination:
   (a) a supporting base with a hard flat level surface formed thereon,
   (b) a hard opaque reflecting film on said flat surface,
   (c) a convex optical lens,
      (1) said lens resting with the convex surface thereof on said reflecting film in elastic contact therewith,
   (d) a longitudinally extending weighing bar mounted on and connected to the upper face of said lens,
   (e) a first weighing pan depending from one end of said bar for receiving material to be weighed,
   (f) a second weighing pan depending from the other end of said bar for supporting graduated incremental weights,
   (g) an optical magnifying device having an eyepiece and at least one objective lens element in alignment and mounted over said lens and said surface,
      (1) said optical device displaying a magnified view of a field including the contact area between said convex surface of said lens and said reflecting film,
   (h) a light source,
   (i) means to direct only monochromatic light from said source to illuminate said field from above, (1) said contact area appearing as a dark circular spot,
(2) said spot being surrounded by the image of an interference system of concentric rings, and
(j) image datum means superimposed in focus on said field against which to observe and refer the extent of displacement of said contact area and interference system upon tilting of said lens from the deposition of material on said first weighing pan and weights on said second weighing pan.

References Cited by the Examiner

UNITED STATES PATENTS

| | | | |
|---|---|---|---|
| 2,228,872 | 1/41 | Durfee | 177—188 |
| 2,914,361 | 11/59 | Turner | 177—190 |
| 2,972,278 | 2/61 | Bingley | 88—24X |

FOREIGN PATENTS 777,337 6/57 Great Britain.

LEO SMILOW, *Primary Examiner.*